UNITED STATES PATENT OFFICE.

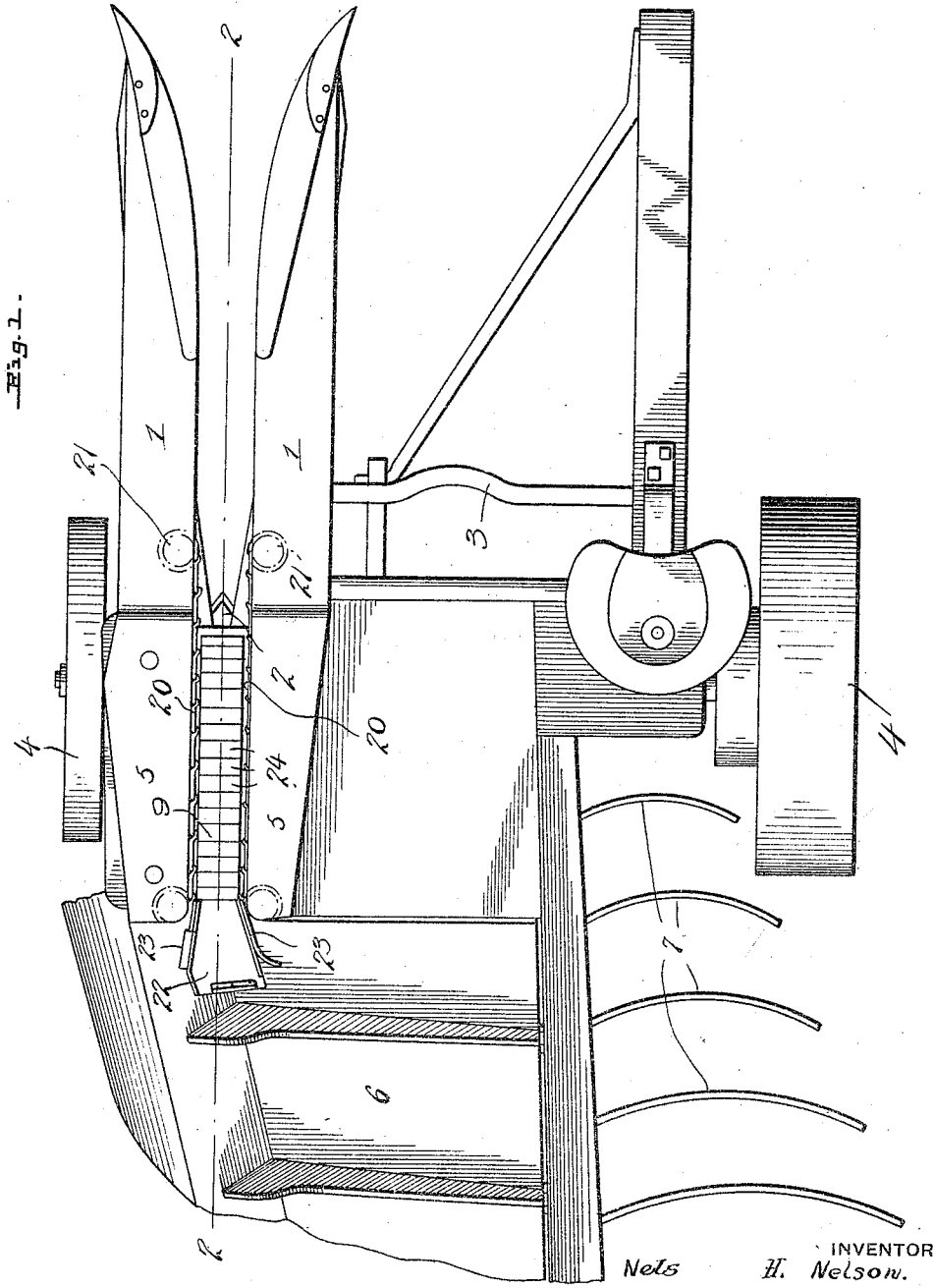

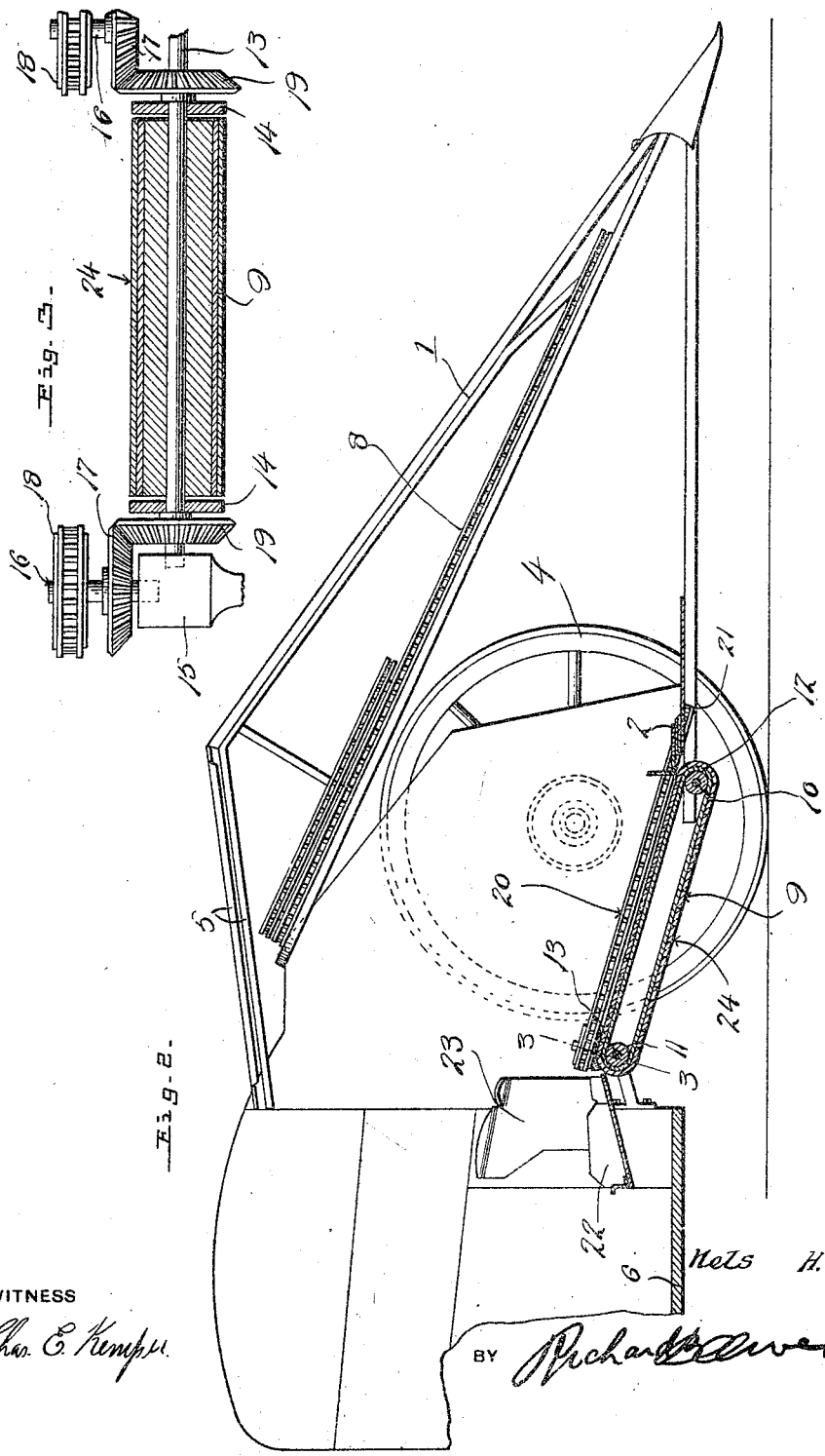

NELS H. NELSON, OF DALE, MINNESOTA.

CORN-HARVESTER.

1,259,767.　　　　　Specification of Letters Patent.　　Patented Mar. 19, 1918.

Application filed May 27, 1916. Serial No. 100,276.

*To all whom it may concern:*

Be it known that I, NELS H. NELSON, a citizen of the United States, residing at Dale, in the county of Clay and State of Minnesota, have invented certain new and useful Improvements in Corn-Harvesters, of which the following is a specification.

This invention has relation to improvements in corn harvesters, and the nature and objects thereof will be readily apparent to those skilled in the art to which it appertains, in the light of the following explanation of the accompanying drawings, illustrating what I now believe to be the preferred embodiment or mechanical expression of my invention from among other forms and arrangements within the spirit thereof, or the scope of the appended claim.

However, an object of the invention is to provide means in a self-binding corn harvester whereby the butts of the stalks may be carried up as readily as the tops, and the stalks accurately positioned before the tying mechanism.

In addition to the foregoing, my invention comprehends improvements in the details of construction and arrangement of parts to be hereinafter described and particularly pointed out in the appended claim.

In the accompanying drawings in which similar and corresponding parts are designated by the same characters of reference throughout the several views in which they appear;

Figure 1 is a view in plan of a corn harvester of conventional type, illustrating the application of my invention.

Fig. 2 is a longitudinal section on the line 2—2 of Fig. 1, and

Fig. 3 is a transverse section on the line 3—3 of Fig. 2.

In corn harvesters of the type heretofore provided, the tops of the stalks are positively carried up while the butts or lower ends are permitted to slide up an incline pan which is stationarily mounted relative to the machine. As a consequence short stalks will not be engaged by the carrying means mentioned above, and the space between the guards of the machine becomes clogged with the stalks thereby interrupting the operation of the machine until the stalks are removed. I therefore propose to provide means for positively supporting and carrying up the butts of the stalks to obviate the disadvantages mentioned above.

With reference to the drawings, 1 indicates the inclined guides of a corn harvester, horizontally spaced to receive the standing stalks therebetween, and 2 indicates the cutting mechanism located in vertical alinement with the rear ends of the guides but disposed just above the ground. The frame of the machine is indicated generally at 3, and is supported upon ground wheels 4. The guards 5 are located just behind the guides 1 and inclined downwardly and rearwardly toward the receiving platform 6, upon which the tying mechanism (not shown) is located, and 7 is the arms for receiving the bundle of stalks after they are tied.

Supporting chains 8 are mounted for movement in contiguous relation with the guides 1 in the usual manner, for raising the stalks from the ground and for supporting them while being cut by the cutting blade 2. Located in vertical alinement beneath the space between the guards 5 is an inclined carrier 9 of the endless type, mounted upon forward and rear rollers 10 and 11 respectively, the rearmost roller being higher so as to dispose the carrier rearwardly and upwardly, substantially parallel to the chains 8. The rollers are mounted upon shafts 12 and 13, said shafts being journaled in side frame members 14. One end of the shaft 13 is mounted in a bearing 15 which also supports a stub shaft 16 carrying a beveled gear 17 and a sprocket 18. A beveled gear 19 on the shaft 16 is adapted for engagement with the gear 17 whereby motion of said shaft is transmitted to the shaft 16, the shaft 13 deriving its power from the ground wheels in a manner well known in this type of corn harvester. A sprocket 18 is located at each side of the carrier 9, and chains 20 are adapted to travel coincidently with said carrier and adjacent each edge thereof, the lower terminals of said chains passing around sprockets 21.

A butt pan 22 of the usual type is located adjacent the rear end of the carrier 9, and is mounted for vertical adjustment in guides 23. The carrier 9 may be provided with transverse slats 24 to provide a better bearing surface for the ends of the stalks.

In operation, the stalks are raised from the ground by means of the chains 8, and severed upon their engagement with the cutting mechanism. The butts are immediately engaged by the conveyer 9, and the chains 20 and carried up simultaneously with the tops of the stalks which are engaged between the upper chains 8. In this manner clogging of the mechanism is rendered absolutely impossible, regardless of the fact that the short stalks may not reach the upper chains. The stalks are next received upon the butt pan 22 and fed into the tying mechanism in a manner well known, and which does not form a part of this invention. Thus it will be seen that I have devised an improvement in the corn binder which obviates a series disadvantage to which the binder has been heretofore subject.

While I have illustrated and described my invention with some degree of particularity, I realize that in practice various alterations thereover may be made, and I therefore reserve the right and privilege of changing the form of the details of construction, or otherwise altering the arrangement of the correlated parts without departing from the spirit of the invention or the scope of the appended claims.

Having thus fully described my invention what I claim as new and desire to secure by Letters Patent is:—

The combination with a corn harvester including inclined spaced guides, supporting chains movable in contiguous relation thereto, cutting mechanism and a butt pan, of an endless carrier located between the cutting mechanism and the pan, spaced rollers for supporting the carrier, a bevel gear mounted on each end of one of the rollers, chains movable in contiguous relation to the edges of the carrier, said carrier and chains being inclined substantially parallel to the supporting chain, sprockets for supporting the chains, and bevel gears on one pair of said sprockets, meshing with the first mentioned bevel gears for actuating the carrier and chains simultaneously whereby the butts of the stalks are carried upward by said carrier and chain simultaneously with the tops and delivered to the butt pan.

In testimony whereof I affix my signature in presence of two witnesses.

NELS H. NELSON.

Witnesses:
G. O. SJORDAL,
D. G. JOHNSON.